Feb. 23, 1965 A. W. COOK ET AL 3,170,543
DELAY VALVE
Filed Dec. 6, 1962 2 Sheets-Sheet 1

INVENTORS
ALBERT W. COOK
BY CARL E. BRICKER

J. B. Holden
ATTORNEY

Feb. 23, 1965  A. W. COOK ET AL  3,170,543
DELAY VALVE

Filed Dec. 6, 1962  2 Sheets-Sheet 2

INVENTOR.
ALBERT W. COOK
BY CARL E. BRICKER

J.B.Holden
ATTORNEY

United States Patent Office 3,170,543
Patented Feb. 23, 1965

3,170,543
DELAY VALVE
Albert W. Cook, Tallmadge, and Carl E. Bricker, Cuyahoga Falls, Ohio, assignors to The Goodyear Tire & Rubber Company, Akron, Ohio, a corporation of Ohio
Filed Dec. 6, 1962, Ser. No. 242,683
7 Claims. (Cl. 188—152)

The present invention relates to delay valves, and especially to hydraulic brake apparatus including conventional braking means therein and a delay valve in the hydraulic system for delaying application of full braking pressures in the braking system.

Heretofore there have been many different types of hydraulic brake systems provided, but insofar as we are aware, substantially all of such braking systems have been adapted to provide full braking pressures substantially instantaneously when the brake means are actuated.

In some braking installations, for example, on a helicopter rotor brake, it is very desirable to provide a brake for the helicopter rotor where relatively small braking pressures can be applied to the helicopter rotor when it is operating but yet very satisfactory braking action will be obtained. However, after the blades have been stopped, it is desirable to use a relatively high pressure to retain the rotor blade hub against rotation, as by the action of a turbo drive for the helicopter rotor, which turbo drive, even at the slowest speeds, turns relatively fast and applies appreciable torques to the rotor hub.

Other applications may also exist where it is desirable to apply the braking pressures gradually to the brake means to prevent the creation of excessive stresses in the brake, or other associated means.

The general object of the present invention is to provide a novel and improved hydraulic braking means characterized by the provision therein of a delay valve connected in the hydraulic system for instantaneously applying some braking pressure when the braking means is actuated, but for gradually, or slowly building up the full braking pressures in the braking means.

Another object of the invention is to provide, automatically, at least two different programmed pressures to a brake from a single high pressure source by only one control valve in the brake system up to the brake means.

Another object of the invention is to provide a delayed build up of full braking pressures in a braking system, but yet to provide an instantaneous release of the braking pressures when the actuating means in the hydraulic system are released.

Another object of the invention is to provide a special type of a delay or control valve particularly adapted for use with a brake means wherein the brake piston and brake means increases its displacement requirements as the brake lining wears with use.

A further object of the invention is to provide a special delay valve for use in brake means and where the full braking pressure is permitted to pass to the brake piston cylinder until a desired pressure is set up therein, after which additional flow of brake pressure liquid to the brake piston cylinder is delayed by the valve means of the invention.

A further object of the invention is to provide a positive acting delay valve in a hydraulic braking system, which delay valve comprises a relatively long tube, having a capillary size bore, as a communication means in the hydraulic system for transmitting braking pressure fluid to a braking chamber for slow build-up of full braking forces therein.

Yet another object of the invention is to provide relatively inexpensive, uncomplicated but sturdy delay valves requiring little or no maintenance thereon over a long operating life for special application, or delayed build-up, of braking pressures in a braking system.

The foregoing and other objects and advantages of the invention will be made more apparent as the specification proceeds.

Attention now is particularly directed to the accompanying drawings, wherein.

Figure 1:
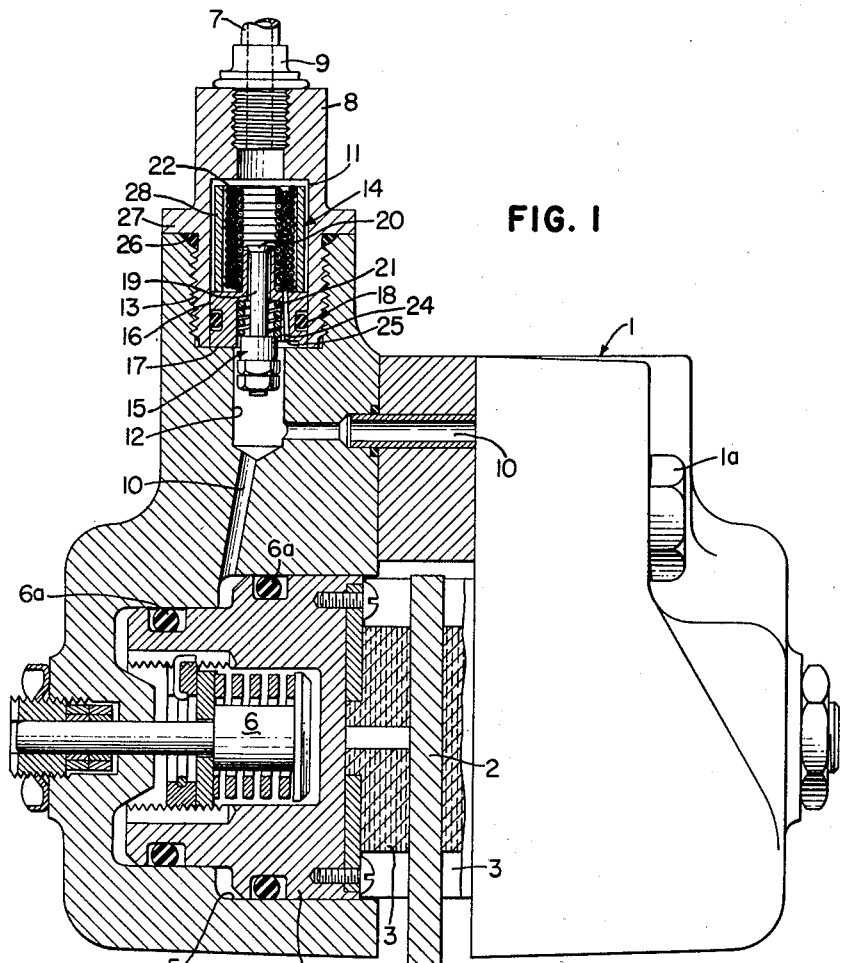
FIG. 1 is a fragmentary side elevation, partially broken away to show some portions in vertical section, of brake means having a delay or control valve embodying the principles of the invention associated therewith.

The present invention relates to a hydraulic brake including conventional means therein for braking action, such as a hydraulic system, means for applying pressure to the hydraulic brake of the system, a housing, and brake means operating carried by the housing and including a pressure chamber. The invention particularly relates to a novel delay or control valve provided in the brake system and including valve means positioned in the housing in a bore means thereof connected to the pressure chamber, or cylinder to prevent passage of liquid to the brake piston cylinder on pressure application but to release liquid upon release of pressure from the actuating fluid, and a small diameter, coiled tube operatively positioned in the housing and connecting to spaced portions of the bore means to provide a bypass around the valve means so that the pressure applied to the liquid in the hydraulic system is instantly applied to the brake piston but with full braking pressure being supplied after a time delay produced by flow of the necessary volume of liquid through the tube to the brake pressure cylinder. A modified delay valve of the invention permits full flow of hydraulic fluid to the brake pressure cylinder until partial operating pressure is set up therein.

When referring to corresponding means shown in the drawings and referred to in the specification, corresponding numerals are used to facilitate comparison therebetween.

Particular attention is now directed to the details of the structure shown in the drawings, and a brake housing 1 is illustrated therein. The housing 1 is made in two similar halves held together by bolts 1a, with only one half of the housing being shown in section. The housing 1 is secured to a suitable fixed member in the helicopter rotor assembly or other unit being braked. The housing 1 has a conventional member, such as a flat brake disc 2, rotatably associated therewith and extending intermediate bifurcated portions of the housing 1 for braking action, as is provided in many conventional brakes, by the application of pressures to opposite sides of the brake disc 2 normal to the plane defined thereby. The apparatus of the invention includes a pair of members, such as friction blocks 3 engaging with opposite sides of the disc 2. Looking at the cross-sectioned portion of the housing the block 3 is secured to a brake piston 4 slidably received in a cylinder 5 formed in the housing 1 and having a longitudinal axis parallel to but offset from the axis of the brake disc 2. Wear compensating and return spring means, indicated as a whole by the numeral 6, may be provided in operative engagement with the piston 4, and the piston 4 is slidably sealed in the cylinder 5 by conventional means, such as a pair of O-rings 6a, carried in peripherial recesses in the brake position. In the form of the invention illustrated piston 4 and cylinder 5 are made with stepped diameters as shown.

A hydraulic pressure supply conduit 7, is suitably connected to the housing 1 by a sleeve 8 having threaded engagement with a portion of the housing 1. A fitting 9 fastens the conduit 7 to the sleeve 8.

The housing 1 has suitable bore means 10 provided therein that operatively connects a bore 11 of the sleeve 8 to the cylinder 5. This bore means 10 is shown as having a counterbored end 12 connecting to an enlarged recess 13 in the necked extension of the housing to which the sleeve 8 is connected.

The novel delay or control valve of the invention is shown in FIGURE 1 and is referred to as a unit by the numeral 14. The delay valve 14, as an important feature or element thereof, includes a member such as a poppet valve 15. The poppet valve 15 comprises a valve body 16 acting as a piston and received on a shoulder 17 formed by the base of the recess 13, and lateral portions of this valve body 16 are positioned immediately adjacent and slidably sealed against the bore 11 of the sleeve 8 adjacent the axially inner end thereof by a conventional member, such as an O-ring 18. A valve stem 19 is slidably positioned with considerable clearance in the bore of the valve body 16 and a valve head 20 is urged to seat against the axially outer end of the valve body 16 by suitable means, such as a light coil spring 21, engaging tension adjusting lock nuts or other means carried by the lower end of the valve stem 19 and seating on a lower portion of the valve body 16 to keep the spring under slight compression. The spring 21 hence aids the action of pressure liquid applied against the upper end of the valve head 20 in maintaining such valve head in fluid tight engagement with its seat on the end of the valve body 16 whereby no pressure liquid will normally flow through the center bore of the valve body 16 to the cylinder 5. However as later explained herein, the poppet valve 15 will permit the substantially instantaneous release of pressures in the cylinder 5 upon release of the actuating means for the hydraulic system.

Figure 2:
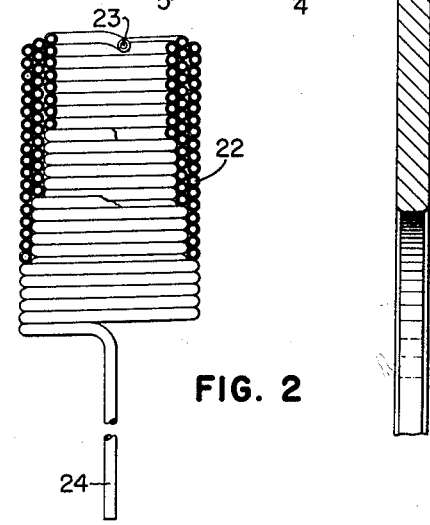
FIG. 2 is an enlarged fragmentary elevation of a special portion of the delay valve of the invention comprising a coiled, small diameter tube, portions of which are shown in vertical section and other portions of which are shown in an elevation, with parts of the tube being broken away for clarity.
Figure 3:
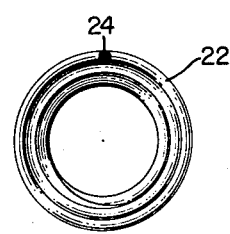
FIG. 3 is a bottom plan view of the tube shown in FIG. 2.

As yet a further and important feature of the invention, a very small diameter tube 22 is provided in the delay valve 14 for transmitting pressure liquid from the bore 11 of the sleeve 8 to the bore means 10 connecting to the cylinder 5. Such small diameter tube 22, which may be as much as 8 ft. long, and which may have only a capillary sized opening therein, for example, an opening of .014 inch, is coiled upon itself in a plurality of convolutions which may have several bands of concentric convolutions provided in the coiled tube, as best indicated in FIG. 2 of the drawings. Thus, an inlet end 23 is provided on such tube 22 and it may protrude slightly radially inwardly of the convolutions formed in the tube for communication with pressure liquid received in the bore of the sleeve 8, and an opposite, or discharge end 24 of the tube 22 is extended so as to protrude axially from or beyond the remainder of the discharge tube 22. Such outlet end 24 in this instance is shown as received in sealed relation in and extending through a bore 25 provided in the valve body 16 whereby, in effect, the tube 22 at the inlet and outlet ends 23 and 24, respectively thereof, communicates with spaced portions of the bore means provided for flow of pressure liquid to and through the housing 1 to the cylinder 5 therein. Such tube 22 is positioned as a bypass around the poppet valve 15 so that after the initial application of the brakes all flow of pressure liquid to the cylinder 5 must pass through the elongate, narrow diameter tube 22. With a tube 22 having a bore or opening of .014 inch and a length of 8 feet the length of the opening is hundreds of times its diameter. Flow through such an opening effects the time delay.

In the operation of the apparatus of FIG. 1, in which the parts are shown in brake-applied position, the piston return spring of means 6 upon release of brake operating pressure applied to conduit 7 causes the piston 4 to move fully to the left. The system is, of course, full of brake fluid so that movement of piston 4 fully to the left pushes fluid against the under side of piston-valve body 16 to raise it vertically until spacer sleeve 28 strikes the end of bore 11. Clearance is thus provided between brake blocks 3 and disc 2.

Upon the reapplication of braking pressure to conduit 7 piston-valve body 16 moves downwardly to engage with shoulder 17 moving pistons 4 to engage brake blocks 3 with disc 2 with an initial limited pressure. In fact, the operation just described takes the displacement, i.e., clearance, out of system. Further pressure build up is relatively slow resulting from the necessity for the pressure fluid to now flow through restricted orifice tube 22. Thus, a delay action will be obtained, dependent upon the length of the tube 22, its diameter, and the pressures applied, so that some time lag occurs in building up the full braking pressures on the brake means shown in association with delay valve 14 of the invention.

Upon brake pressure release, piston 4 moves fully to the left, piston-valve body 16 again moves upwardly until sleeve 28 strikes the upper end of bore 11, and any further pressure in the fluid behind piston 4 is relieved by the poppet valve 15 opening.

Any suitable means, such as a gasket 26, can be positioned intermediate a shoulder 27 provided on the sleeve 8 and an associated end portion of the housing 1 to seal such two members in engagement. The positioning or retaining sleeve 28 placed around the tube 22 protects the tube and acts to limit the movement of the piston-valve body 16.

The brake system of FIG. 1 is a constant displacement system wherein pressure plotted against time is a gradually rising curve from zero pressure and time, the curve levelling off at maximum pressure. The time is controlled, of course, by the size of the bore of tube 22.

Figure 4:
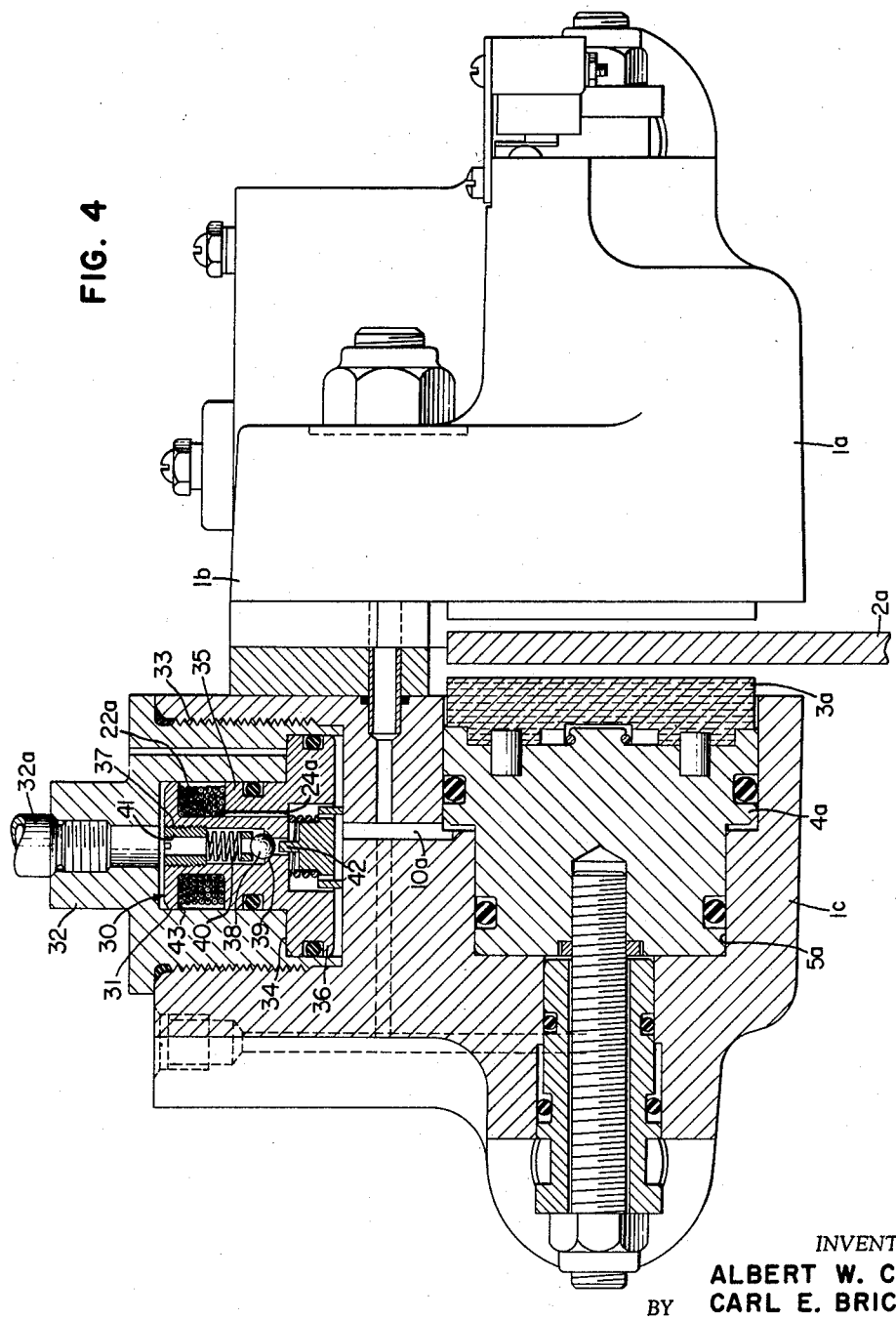
FIG. 4 is a fragmentary side elevation, partly broken away and shown in vertical section, of a modification of a brake means and delay valve of the invention.

Attention now is particularly directed to FIG. 4 of the drawings where a brake is shown that has a modified type of a delay or control valve of the invention associated therewith by which a desired quantity of braking liquid can be rapidly transmitted to the brake piston cylinder for building up a desired initial pressure therein after which further flow of braking fluid and additional build-up of pressure in the brake system is controlled by the delay valve means of the invention. This system can be called a variable displacement system in which pressure plotted against time produces a curve starting with the initial pressure and running flat for a selected time and then rising sharply to level off at the maximum pressure.

A brake housing 1b is shown formed of similar halves 1c and 1a that has a brake disc 2a rotatably associated therewith. Only one side of the housing is shown in section and will be described. A double diameter brake piston 4a is shown slidably received in a cylinder 5a formed in the housing 1c. Hydraulic liquid flows to the brake piston cylinder 5a through a suitable bore means 10a provided in the housing. This hydraulic liquid flows to the bore means 10a through a novel control or delay valve of the invention indicated as a whole by the numeral 30.

The delay valve 30 is positioned within a bore 31 of a tubular cap or cover member 32 threaded into a recess 33 formed in a portion of the housing 1. The cap 32 has a counterbored inner end 34 for a purpose to be explained hereinafter in more detail. A chamber is thus provided between the cap 32 and the base portion of the recess 33 and a control piston 35 having an enlarged lower end or head 36 provided thereon is slidably received in such chamber with the enlarged head 36 being received in the counterbore 34 formed in the cap 32. Such control piston 35 has an axially extending bore 37 formed therein that communicates with a conduit 32a connected to the upper and outer end of the cap 32. A ball valve 38 is normally urged against a valve seat 39 in the bore 37 by suitable means, such as a coil spring 40 that may seat on a positioning sleeve, or stop 41. Now with the parts in brake-off position as shown when the brake is applied the flow of fluid axially inwardly through the bore 37 normally is prevented by ball valve 38 and the hydraulic pressure fluid applies downwardly directed forces against the upper end of the control piston 35. The enlarged head 36 of the control piston 35 connects to the brake piston cylinder 5a so that when piston 35 is moved downwardly in the recess 33 by the application of fluid pressure it will begin to move piston 4a to apply the friction blocks 3a against disc 2a. Upon such movement, the ball 38 strikes a stop finger 42, suitably positioned in the recess 33 at the lower end of the control piston 35, to force the ball 38 from its valve seat 39 whereby the fluid, under braking pressures, freely flows past the ball for transmission to the brake piston cylinder 5a to build up, substantially instantaneously, appreciable initial braking pressure therein.

Braking pressures thus applied also engage the enlarged head 36 of the control piston 35 to urge it upwardly so that once the initial braking pressures within the cylinder 5a have been built up then the control piston 35 is forced upwardly of the recess 33. Such action closes ball 38 on seat 39 and prevents transmission of additional fluid to the cylinder 5a. Additional flow can only be obtained through flow restricting means such as a very small diameter, elongate tube 22a which is received in a recess 43 provided in the periphery of the control piston 35. Such tube 22a has an outlet end 24a thereon that extends through the control piston 35 to connect to the lower end thereof and has its inlet end in communication with the brake pressure liquid as supplied to the bore 37.

The control piston 35 is suitably sealed in the bore 31 and counterbore 34 provided in the cap 32. Any known return spring and/or wear compensating means can be associated with the brake piston 4a to aid in returning the piston to brake clearance position and to compensate automatically for wear of friction block 3a.

It will be seen that the delay valve 30 of FIG. 4 functions to permit substantially instantaneous build-up of an initial brake pressure, after which any further build-up of braking pressures will occur slowly by passage of hydraulic fluid through the small diameter tube 22a until full brake pressure is achieved.

When the brake pressure is released, as by the person piloting the plane or vehicle in which the brake assembly is used, the pressure in the bore 31 drops causing the ball 38 to be lifted from its seat and the brake pressure is immediately reduced by flow of fluid upwardly and outwardly of the delay valve 30 with the piston 4a being moved to the clearance position shown. The brake means are then ready for another actuation.

It will be seen that two programmed pressures in the brake cylinder 5a are thus achieved from a single fluid pressure source.

"Bore means," when referred to in the claims, may be interpreted to mean the entire connection and means in the brake housing and hydraulic pressure supply line between the pressure cylinder and the pressure supply.

The foregoing constructions provide excellent types of controllable delay action for brake means of any desired type. The displacement take up, the initial pressure, if any, and the delay can be predetermined to achieve operating conditions desired for the brake and by selection of the proper size and length of the tube 22 or 22a. The delay valve portion of the invention does not require any appreciable servicing over a long service life, so that it is believed that the objects of the invention have been achieved.

While a certain representative embodiment and details have been shown for the purpose of illustrating the invention, it will be apparent to those skilled in this art that various changes and modifications may be made therein without departing from the spirit or scope of the invention.

What is claimed is:

1. In a hydraulic brake including a hydraulic system and means for applying pressure to the hydraulic brake of the system, a housing, and brake means slidably carried by said housing in a pressure chamber provided therein, said housing having a bore therein for connecting the hydraulic system to said pressure chamber, a delay valve comprising poppet valve means positioned in said housing in said bore means to prevent passage of liquid to said pressure chamber on pressure application but to release liquid upon release of the pressure applying means, said delay valve having a small sliding clearance in said housing whereby a portion of the pressure applied to the liquid in the hydraulic system is instantly applied to said brake means and a coil of small diameter tubing operatively positioned in said housing and connecting to spaced portions of said bore means to provide a bypass around said poppet valve means whereby full liquid pressure is applied to said brake means after a time delay occasioned by the slow flow of a volume of liquid through said tubing.

2. In a hydraulic brake including a closed hydraulic system and means for applying pressure to the hydraulic brake of the system, a housing having a brake piston cylinder therein, a brake piston slidably received in said brake piston cylinder, brake means operatively connected to said brake piston and said housing, a hydraulic supply tube operatively connected to said housing, said housing having bore means connecting said hydraulic supply tube to said brake piston cylinder at a portion thereof for receiving pressure liquid applied to an outer portion of said brake piston, poppet valve means positioned in said housing in said bore means to prevent passage of liquid to said brake piston cylinder on pressure application but to release liquid upon pressure release, and a coil of small diameter tubing operatively positioned in said housing and connecting to spaced portions of said bore means to provide a bypass around said poppet valve means whereby because of the closed hydraulic system a portion of the pressure applied to the liquid in the hydraulic system is instantly applied to said brake piston but with full liquid pressure being supplied only after a time delay produced by flow of a sufficient volume of liquid through said tubing.

3. In a hydraulic brake including a hydraulic system and means for applying pressure to the hydraulic brake of the system, a housing having a pressure chamber formed therein and brake means slidably carried in said pressure chamber, said housing having bore means therein connecting the hydraulic system to said pressure chamber, and a delay valve comprising:

means forming a control chamber in said housing, a control piston having an outer end and an enlarged inner end receiving pressure from said pressure chamber slidably received in said control chamber and receiving full braking pressure on its outer end, valve means operatively positioned in said housing in said bore means to normally prevent passage of liquid to said pressure chamber by the applied pressure but to release liquid therefrom upon brake pressure release, stop means carried by said housing in said control chamber to open said valve means upon temporary axial inward movement of said control piston to permit passage of a portion of said applied pressure to said pressure chamber until said control piston backs off as the pressure builds upon the enlarged inner end thereof to close said valve means, and an elongate small diameter tube connecting to spaced portions of said bore means to provide a by-pass around said valve means for full pressure supply to said brake means after a time delay produced by flow of liquid through said tube.

4. In a hydraulic brake including a hydraulic system and means for applying pressure to the hydraulic brake of the system, a housing having a brake cylinder formed therein, and brake means slidably carried by said brake cylinder, said housing having bore means therein connecting the hydraulic system to said brake cylinder, and a delay valve comprising:

means forming a control chamber in said housing, a control piston having an outer end and an enlarged inner end receiving pressure from said pressure chamber slidably received in said control chamber and receiving full braking pressure on its outer end, valve means operatively positioned in said housing in said bore means to normally prevent passage of liquid to said pressure chamber on the applied pressure but to release liquid therefrom upon brake pressure release, means carried by said housing in said control chamber to open said valve means upon temporary axial inward movement of said control piston to permit passage of a portion of said applied pressure to said pressure chamber until said control piston backs off to close said valve means after a pre-determined pressure build up in said pressure chamber, and flow restricting means connecting to spaced portions of said bore means to provide a by-pass around said valve means for full pressure supply to said brake cylinder after a time delay produced by flow of liquid through said flow restricting means.

5. A fluid pressure brake including a housing having a pressure cylinder, a pressure supply conduit connected to the housing, said housing having bore means connecting the conduit and the cylinder, a piston mounted for limited movement in the bore means, a poppet valve carried by the piston and allowing flow of fluid through the piston when open, as upon release of brake pressure to the conduit, but normally closing upon application of pressure through the conduit, an elongated small orifice tube connecting opposite sides of the piston, and fixed stop means for opening the poppet valve upon movement of the piston to its limit in one direction, said piston having a greater effective area towards the cylinder than towards the conduit so that as the pressure builds up in the cylinder the piston moves to the opposite end of its limited movement to move away from the fixed stop and allow the poppet valve to close whereby further pressure build-up in the cylinder must be through the tube.

6. The combination of a fluid pressure brake, a fluid pressure supply conduit, and a brake pressure delay mechanism connecting the brake and the conduit, said mechanism including a piston movable through a limited distance to apply only part of the pressure applied in the conduit to the brake, and a small orifice tube connecting opposite sides of the piston, the length of the tube being hundreds of times the diameter of the orifice so that thereafter full pressure at the brake is gradually built up by fluid flow through the tube.

7. The combination defined in claim 6 wherein a spring positioned poppet valve normally closes a comparatively large passage through the piston.

References Cited by the Examiner
UNITED STATES PATENTS

| | | | |
|---|---|---|---|
| 1,460,164 | 6/23 | Loughead | 188—152 |
| 1,569,143 | 1/26 | Robinson. | |
| 2,591,793 | 4/52 | Dubois et al. | 188—152 X |
| 2,918,797 | 12/59 | Oswalt | 188—152 X |
| 3,069,858 | 12/62 | Elliott. | |

ARTHUR L. LA POINT, *Primary Examiner.*

EUGENE G. BOTZ, *Examiner.*